US012687505B2

(12) United States Patent
Zaman et al.

(10) Patent No.: US 12,687,505 B2
(45) Date of Patent: Jul. 21, 2026

(54) RADIOGRAPHIC INSPECTION OF MECHANICAL FASTENERS

(71) Applicant: The Boeing Company, Arlington, VA (US)

(72) Inventors: Sk Sahariyaz Zaman, Bengalore (IN); Madhurima Bandyopadhyay, Bangalore (IN); Chandrashekhar Chandrashekhar, Bengaluru (IN); Md Shaheed Ali, Bengaluru (IN); Ali Azad, Kirkland, WA (US); Umar Momen, Santa Monica, CA (US)

(73) Assignee: The Boeing Company, Arlington, VA (US)

( * ) Notice: Subject to any disclaimer, the term of this patent is extended or adjusted under 35 U.S.C. 154(b) by 147 days.

(21) Appl. No.: 18/758,391

(22) Filed: Jun. 28, 2024

(65) Prior Publication Data

US 2026/0002894 A1 Jan. 1, 2026

(51) Int. Cl.
*G01N 23/18* (2018.01)
*G01N 23/04* (2018.01)

(52) U.S. Cl.
CPC ............. *G01N 23/18* (2013.01); *G01N 23/04* (2013.01); *G01N 2223/401* (2013.01); *G01N 2223/408* (2013.01); *G01N 2223/422* (2013.01); *G01N 2223/646* (2013.01)

(58) Field of Classification Search
CPC . B64F 5/60; B64F 5/40; H04F 13/275; H04N 13/388; H04N 13/221; H04N 2213/001; H04N 13/243
See application file for complete search history.

(56) References Cited

U.S. PATENT DOCUMENTS

2018/0186475 A1*  7/2018  Garville ................... B64F 5/60
2020/0175352 A1*  6/2020  Cha ...................... G06N 3/0464

FOREIGN PATENT DOCUMENTS

CA       3144361 A1 *  7/2022  ............. G01B 15/04
JP   2006250932 A  *  9/2006  ............. G01N 23/04

* cited by examiner

Primary Examiner — Uzma Alam
Assistant Examiner — Fani Polyzos Boosalis
(74) Attorney, Agent, or Firm — Walters & Wasylyna LLC

(57) ABSTRACT

A system for automated inspection of an installed fastener includes a radiographic generator, a radiographic sensor, and a computer device. The radiographic generator is operable for directing scanning beams of electromagnetic radiation, e.g., x-rays, toward a workpiece having the installed fastener, for instance a rivet. The radiographic sensor collects a radiographic image of a workpiece inclusive of the installed fastener. The computer device processes the image via one or more trained characterization models to localize the installed fastener within the image, and identifies a presence or absence of a defect in the installed fastener. The computer device also characterizes a quality of the installed fastener based on the presence or absence of the defect, and thereafter generates an inspection report indicative of the quality of the fastener. This may include generating an annotated or color-coded image of the installed fastener.

20 Claims, 6 Drawing Sheets

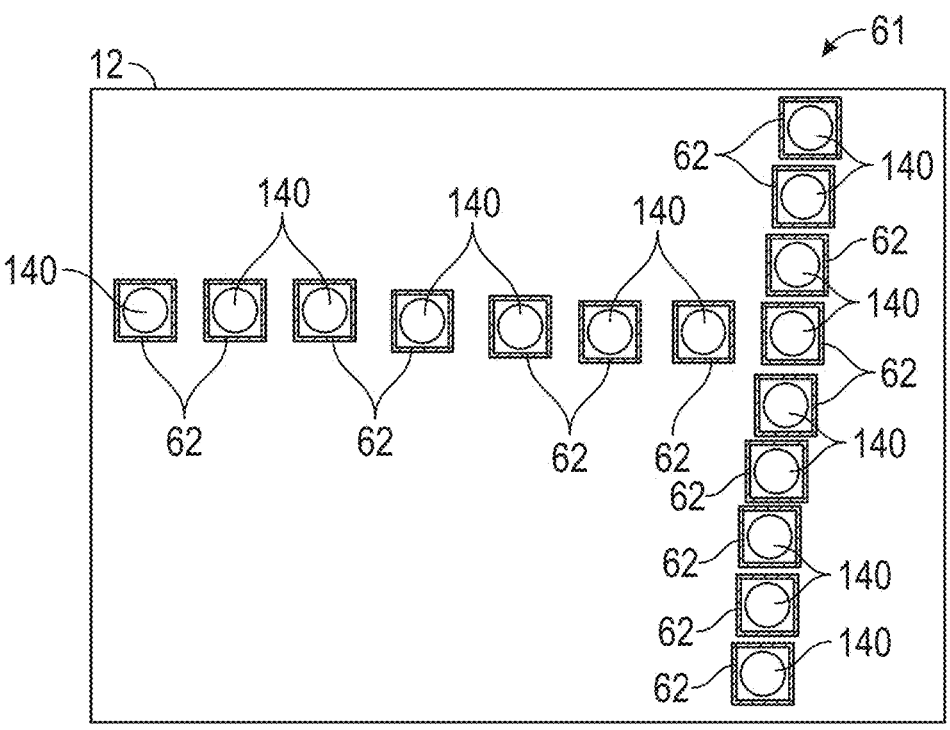
FIG. 5
Defected Rivet
Non-Defected Rivet
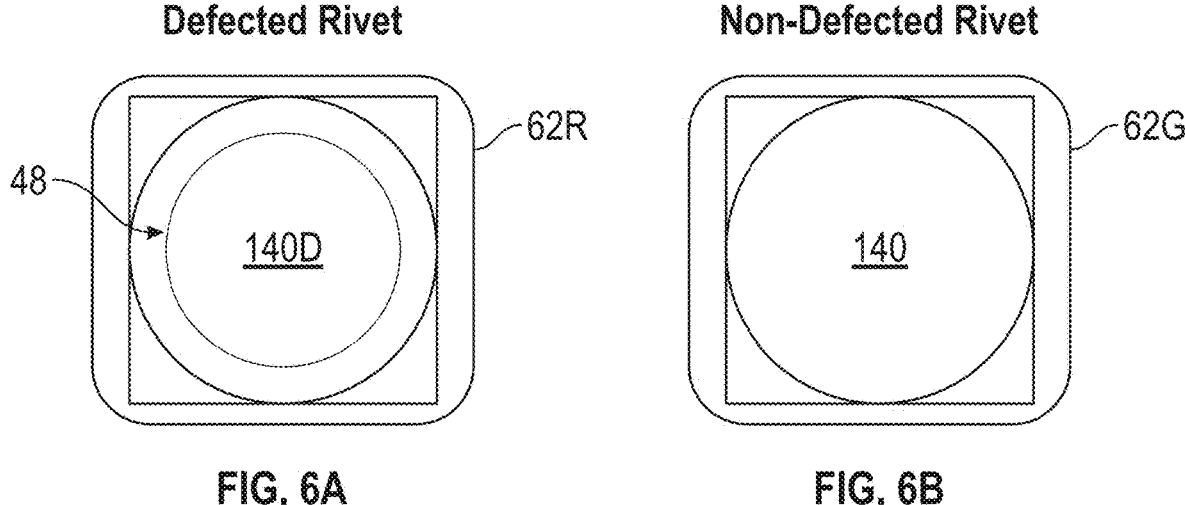
FIG. 6A           FIG. 6B

62R

140D...n

GG

148

62R

140D...n

Defected Rivets

Defected Region Highlighted

RADIOGRAPHIC INSPECTION OF MECHANICAL FASTENERS

INTRODUCTION

Modern aircraft, spacecraft, terrestrial vehicles, and other complex mobile and stationary systems are constructed from a vast number of mechanical and electrical components. For instance, a modern jet-powered passenger airplane may use several million different components in its construction. Many of the constituent components are interconnected using mechanical fasteners such as screws, bolts, nuts, washers, and rivets. Rivets in particular are widely used in aircraft manufacturing, for instance to secure an aluminum skin or other sheet metal panels to the aircraft's ribs, stringers, and other support structure.

A solid shank rivet includes a head and a cylindrical shaft. The shaft is inserted into a hole in a workpiece such that an end or tail of the shaft located opposite the head is left exposed on one side of the workpiece. The exposed end of the rivet shaft is then deformed via a tool. Once the rivet has been installed, the workpiece is effectively clamped between the head and the deformed end, the latter of which is referred to in the art as a shop head or bucktail. Because rivets and other installed fasteners may be inaccessible or may have latent microscopic defects that are not perceptible to the naked eye, inspection of installed rivets often relies on non-destructive inspection techniques.

SUMMARY

An automated inspection process is disclosed herein for inspecting installed fasteners of types commonly used in the manufacturing of aircraft and other mobile or stationary systems. Embodiments of the disclosed solutions use radiographic imaging, e.g., x-ray imaging, to inspect a population of installed fasteners, which in turn are exemplified herein as rivets, e.g., solid shank rivets as described above. A computer device referred to herein as an Automated Rivet Defect Detection (ARDD) system in one or more embodiments is used to process collected x-ray images of the installed fasteners, and to ultimately output an inspection report characterizing a quality of the fastener.

In particular, an aspect of the disclosure includes a system for automated inspection of an installed fastener. The system may include a radiographic generator, e.g., an x-ray generator, operable for directing scanning beams of electromagnetic radiation toward a workpiece having the installed fastener, a radiographic image sensor configured to collect a radiographic image of the workpiece and the installed fastener, and a computer device in communication with the radiographic image sensor. The computer device is configured to process the radiographic image via one or more trained characterization models to thereby localize the installed fastener within the radiographic image, identify a presence or absence of a defect in the installed fastener, characterize a quality of the installed fastener based on the presence or absence of the defect, and generate an inspection report indicative of the quality of the fastener. The inspection report may include an annotated image of the installed fastener.

In some embodiments, the installed fastener is part of a population of installed fasteners on the workpiece, with the computer device configured to generate a composite image of the workpiece that visually identifies the installed fasteners that are defected fasteners.

The computer device may output a bounding box around at least the defected fasteners. In such an embodiment, the bounding box may form a color-coded graphic of the defected fasteners as part of the annotated image. The optional bounding box may include a red bounding box that individually surrounds each respective one of the defected fasteners. A representation of a defect may be displayed within the red bounding box or another boundary box of the defected fasteners.

The one or more trained characterization models may form a population of representative defected fasteners and a population of representative non-defected fasteners.

In one or more embodiments, the installed fastener may include a solid shank rivet, such that the system is configured to inspect the solid shank rivet via the above-noted radiographic generator.

Also disclosed herein is a method for inspecting an installed fastener in a workpiece. An embodiment of such a method includes generating scanning beams of electromagnetic radiation via a radiographic generator, directing the scanning beams of electromagnetic radiation toward the workpiece having the installed fastener, and collecting a radiographic image of the workpiece including the installed fastener via a radiographic image sensor. The method also includes processing the radiographic image via one or more trained characterization models, including localizing the installed fastener within the radiographic image, identifying a presence or absence of a defect in the installed fastener, characterizing a quality of the installed fastener based on the presence or absence of the defect, and generating an inspection report via the computer device that is indicative of the quality of the fastener, the inspection report including an annotated image of the installed fastener.

A system is also disclosed for automated inspection of a population of installed rivets in an aircraft. In one or more embodiments, the system includes an x-ray generator operable for directing x-rays scanning beams toward a sheet metal panel of the aircraft, the sheet metal panel having the installed rivets, an x-ray camera operable for collecting x-ray images of the sheet metal panel and the installed rivets, and a computer device having a non-transitory computer-readable storage memory on which is recorded instructions executable by a processor. When executed, the computer device is caused to process the x-ray images via one or more trained characterization models to thereby localize the installed rivet within the x-ray images. The computer device also identifies a presence or absence of a defect in each of the installed rivets, characterizes a quality of each of the installed rivets based on the presence or absence of the defect, and generates an inspection report indicative of the quality of each of the installed rivets. The inspection report in this implementation may include respective color-coded bounding boxes around each of the installed rivets, such that the color-coded bounding box form a color-coded graphic of defected rivets and non-defected rivets.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIG. 5 illustrates a section of an aircraft panel with rivets that are detected in accordance with an aspect of the ARDD method of FIG. 4.

FIGS. 6A and 6B illustrate defect-containing ("defected") rivets as determined using the ARDD method of FIG. 4 with highlighting of defected portions.

Figure 1:
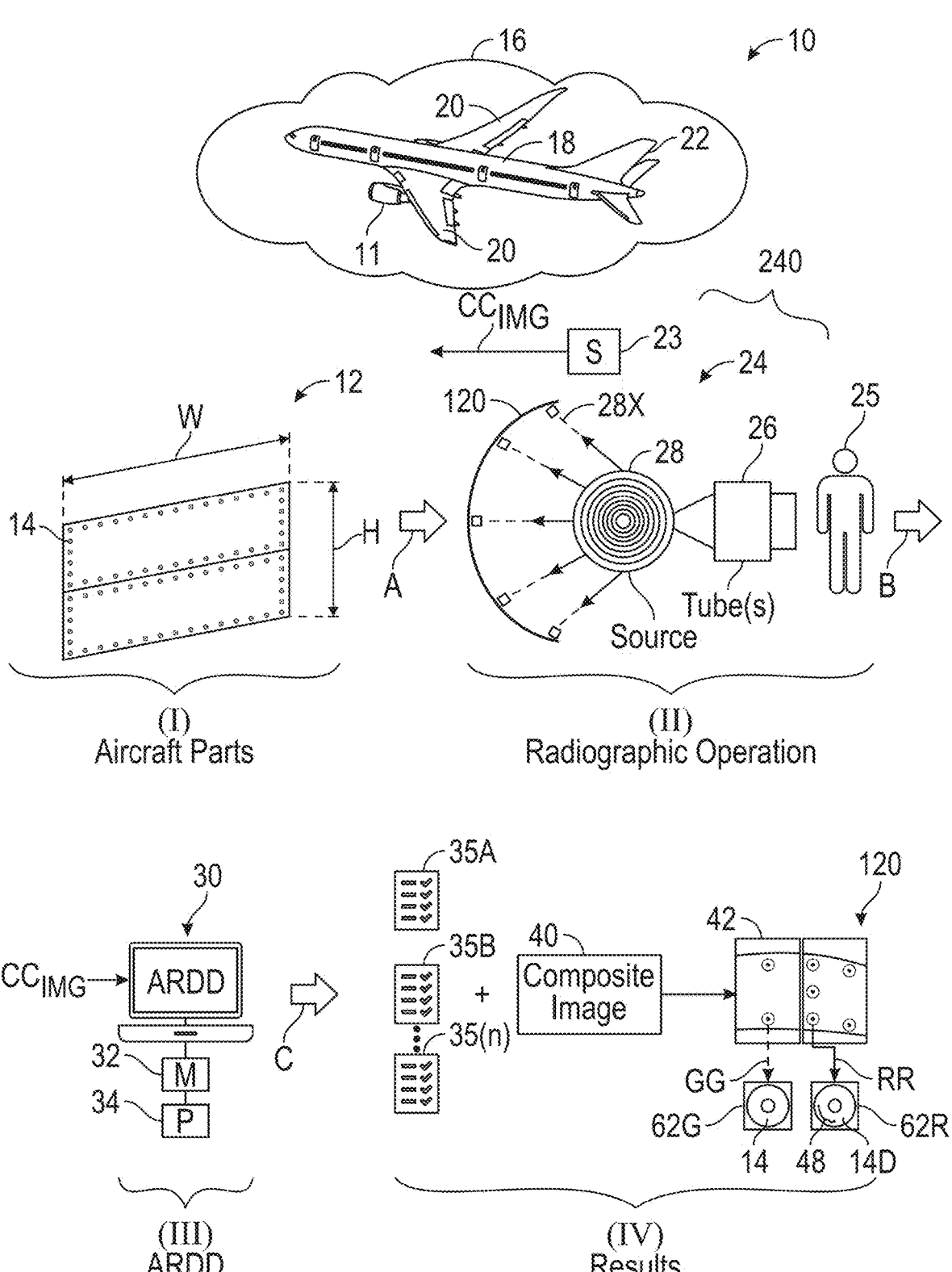
FIG. 1 is a flow diagram illustrating an automated fastener inspection process in accordance with the disclosure.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within ±5% of", or "within acceptable manufacturing tolerances", or logical combinations thereof.

Referring to the drawings, wherein like reference numbers refer to the same or like components in the several Figures, an automated inspection process 10 is shown schematically in FIG. 1 in which a computer device 30, referred to hereinafter as an Automated Rivet Detection System 30 for consistency, is operable for non-destructively inspecting an installed fastener 14. The installed fastener 14 may be optionally embodied as a rivet 140 (see FIGS. 2A and 2B), e.g., a solid shank rivet as described above. However, other types of fasteners 14 may be inspected using the ARDD system 30 in other implementations, for instance screws, bolts, nuts, washers, etc. Rivets 140 in particular are used extensively in aerospace applications, with several million such rivets 140 typically used in the construction of an aircraft 16. Thus, aircraft manufacturers and other users of rivets 140 may benefit from the present teachings, without limiting the disclosure to the inspection to rivets in general or the aerospace industry in particular.

The representative aircraft 16 of FIG. 1 may be configured as a fixed-wing passenger airplane in one or more embodiments. In such embodiments, the aircraft 16 may include a fuselage 18 connected to wings 20 and an empennage assembly 22. Propulsors 11 such as jet engines may be affixed to the wings 20 and/or the fuselage 18 to propel the aircraft 16. As shown in Phase I of FIG. 1, i.e., "Aircraft Parts", the fuselage 18, the wings 20, the empennage assembly 22, and other internal or external surfaces of the aircraft 16 may include various sheet metal panels 12 (or other structure) secured via one or more of the fasteners 14. For instance, the sheet metal panel 12 may be a flat or curvilinear workpiece of a width (W) and height (H) constructed from aerospace-grade aluminum or another lightweight metal and used as part of the outer skin of the representative aircraft 16.

In the aerospace domain, assembled quality is critical to meeting a host of regulatory compliance, safety, and efficiency standards. Multiple quality standards have been established over the years for various aircraft parts. One such quality check is rivet inspection. This may be accomplished via a radiographic imaging process 24 using a corresponding system 240, i.e., a radiographic generator 26, a radiographic image sensor(S) 23, and the computer device 30. As indicated by arrow A in FIG. 1, the sheet metal panel 12 (or another component having a population of the installed fasteners 14), e.g., a curvilinear bulkhead panel 120, is positioned relative to the radiographic generator ("Tubes") 26, e.g., an x-ray generator 26 as shown, and a scanning source 28, the latter of which may direct scanning beams 28X toward the workpiece in Phase II, e.g., "X-Ray Operation" in a non-limiting implementation in which the radiographic processes is an x-ray process, without limitation. For instance, gamma radiation or other suitable bands of the electromagnetic spectrum may be used within the scope of the disclosure.

Radiographic images ($CC_R$) are collected of a population of the installed fasteners 14 via one or more of the radiographic image sensors 23, e.g., one or more x-ray cameras, once the fasteners 14 have been installed in the bulkhead panel 120 or other workpiece. The collected radiographic images ($CC_R$) may be communicated via a wired or wireless connection to the above-noted ARDD system 30. A technician 25 may be present to monitor portions of the radiographic inspection process 10 of FIG. 1, or the process 10 may be fully automated.

As indicated by arrow B in FIG. 1, a series of the collected radiographic images ($CC_R$) are fed into the ARDD system 30 as an image stream ($CC_{IMG}$). The ARDD system 30 indicated at Phase III and labeled "ARDD" in FIG. 1 may be embodied as one or more computer systems configured to execute computer-readable instructions embodying the method 100 of FIG. 4. To this end, the ARDD system 30 may be equipped with non-transitory computer-readable storage medium or memory (M) 32 and one or more processor(s) (P) 34, the latter of which may be implemented as a microcontroller, one or more Application Specific Integrated Circuit(s) (ASICs), Field-Programmable Gate Array (FPGAs), electronic circuits, central processing units (CPUs), etc.

The memory 32 may include associated transitory and non-transitory memory/computer storage media, e.g., read only memory, programmable read only memory, solid-state memory, random access memory, optical and/or magnetic memory, etc. Computer-readable instructions embodying the method 100 may be recorded in the memory 32 and executed by the processor(s) 34 as machine-readable code/ instructions, software, and/or firmware programs. Other hardware components of the schematically-depicted ARDD system 30 are omitted for simplicity but are understood in the art, such as combinational logic circuits, input/output circuits, digital and analog signal conditioning/buffer circuitry, and other hardware components that may be accessed as needed by the processor(s) 34 to provide the control functionality described herein.

Execution of the method 100 of FIG. 4 may rely on a synthetic image generation pipeline 50 to ensure generation of adequate amounts of training data, with a possible implementation of the synthetic image pipeline 50 described below with reference to FIG. 3. The ARDD system 30 of FIG. 1 thereafter processes the collected radiographic images ($CC_R$) in the image stream ($CC_{IMG}$) and inspects the same for the presence or absence of defects, for instance microscopic cracks, cavitation, porosity, etc. This process occurs herein using one or more characterization models 36, as well as computer vision and other programmed functions of the ARDD system 30.

At Phase IV, "Results", the ARDD system 30 shown in FIG. 1 may generate one or more inspection reports 35A, 35B, . . . , 35(n) descriptive of the characterized quality of the various fasteners 14 examined in Phase II. That is, while after the ARDD system 30 characterizes a quality of the installed fastener(s) 14 based on the presence or absence of the defect, the ARDD system 30 auto-generates the inspection report(s) 35A, 35B, . . . , 35(n) each indicative of the quality of the fasteners 14 or a corresponding individual fastener 14, with each inspection report 35A, 35B, . . . , 35(n) possibly including an annotated image 38 of the installed fastener 14 as described below with reference to FIGS. 7A and 7B.

Still referring to FIG. 1, as part of the radiographic inspection process 10 the ARDD system 30 may generate a composite image 40 of the particular component having the population of installed fasteners 14. For instance, for a composite image 40 of a workpiece 42 in the form of the above-noted bulkhead panel 120 in which the fasteners 14 are constructed as rivets 140 (FIGS. 2A and 2B), the ARDD system 30 may, in addition to or integrated into the reports 35A, 35B, . . . , 35C, output a non-defected visual result (GG) and a defected visual result (RR), with GG and RR respectively indicating green and red in a possible color-coded implementation. The composite image 40 in such an embodiment may visually identify which of the installed fasteners 14 are defected fasteners 14D, and therefore possibly defective in a qualitative sense. That is, a defected fastener 14D is one having one or more defects 48, some of which may compromise the structural integrity of the fastener 14 such that the fastener 14 is deemed to be defective. However, the defected fastener 14D in some cases may not be defective, e.g., when the defect 48 is minor in size, shape, or location relative to a standard or threshold. Likewise, the composite image 40 may visually identify which of the installed fasteners 14 are not defected, with identification of only the defected fasteners 14D possibly reducing computational load and simplifying presentation of inspection results.

Therefore, as part of the present approach the ARDD system 30 may provide color-coded graphics of the inspected installed fastener 14, for instance with a color-coded green bounding box 62G surrounding non-defected rivets 140 and a color-coded red bounding box 62R surrounding defected rivets 140D. Within the red bounding box 62R, a representation of one or more defects 48 may be highlighted or otherwise displayed. In this manner, using color-coded bounding boxes 62G, 62R the technician 25 may intuitively review the NDI results from Phase IV and take corrective action as needed, such as by replacing the defected rivets 140D, or possibly subjecting the defected rivets 140D to further tests to determine the extent and criticality of the detected defect(s).

Figure 2A:
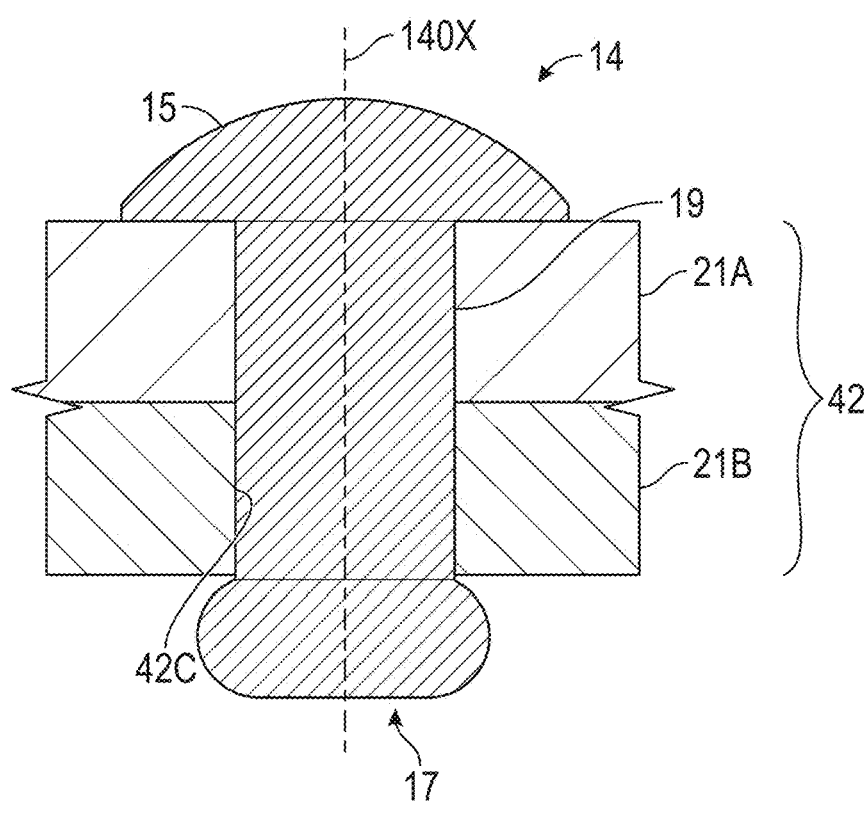
FIGS. 2A and 2B are respective cross-sectional and top view of a representative rivet, the quality of which may be inspected via the automated process as depicted in FIG. 1.
Figure 2B:
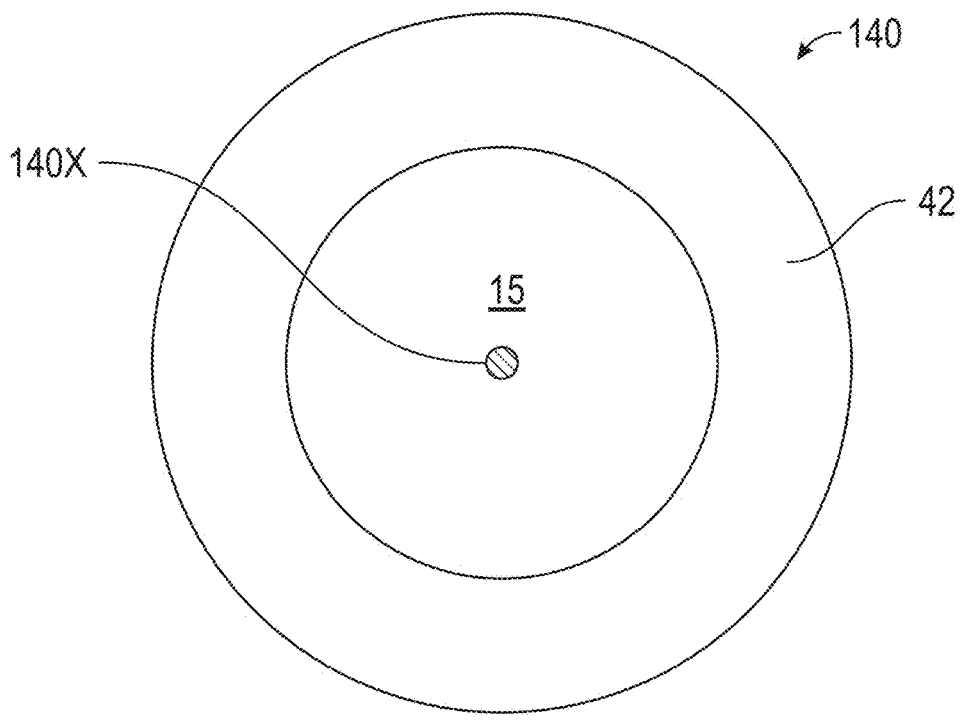

Referring briefly to FIG. 2A and FIG. 2B, the representative rivets 140 contemplated herein serve as a non-limiting type of fastener 14 within the scope of the disclosure. Although other types of fasteners 14 may be inspected via the ARDD system, 30 of FIG. 1, the ubiquity of rivets 140 in the construction of a typical aircraft 16 (see FIG. 1) renders the present teachings of particular benefit during the rivet inspection process. In an exemplary construction, a given rivet 140 constructed of aluminum, steel, titanium, or another application-suitable material is used to join or secure first and second sheets 21A and 2B of the workpiece 42. The rivet 140 includes a rivet head 15 that is integrally formed with a rivet shaft 19, with the rivet shaft 19 having a longitudinal center axis 140X. The rivet shaft 19 is inserted into a hole 42C defined by the workpiece 42. An end 17 of the rivet shaft 19 is then deformed such that the rivet 140 locally joins the first and second sheets 21A and 21B as shown.

Defects may occur prior to or during installation anywhere within the material of the rivet 140, including the rivet head 15, rivet shaft 19, and end 17. Some of the inspected area of the rivet 140 will be inaccessible in the installed position of FIG. 2A, with the rivet 140 remaining inspectable via radiographic means. A typical passenger aircraft, such as the aircraft 16 illustrated in FIG. 1, may have tens of thousands of rivets 140 in each of its wings 20, and possibly several million rivets 140 in the entire aircraft 16. The rivet inspection task is thus particularly daunting and prone to error absent the present teachings.

Within the scope of the present disclosure, the ARDD system 30 of FIG. 1 provides a hybrid solution in which computer vision and machine learning techniques are seamlessly integrated to automate the inspection process and achieve higher detection accuracy. Such benefits are provided with reduced processing time, e.g., of a few seconds per image. As set forth herein, the ARDD system 30 is configured to classify defected fasteners 14D (FIG. 1) and highlight defects 48 therein. This "explainability" feature provides inspectors with an additional degree of confidence and insight regarding classification results and defect severity.

Figure 3:
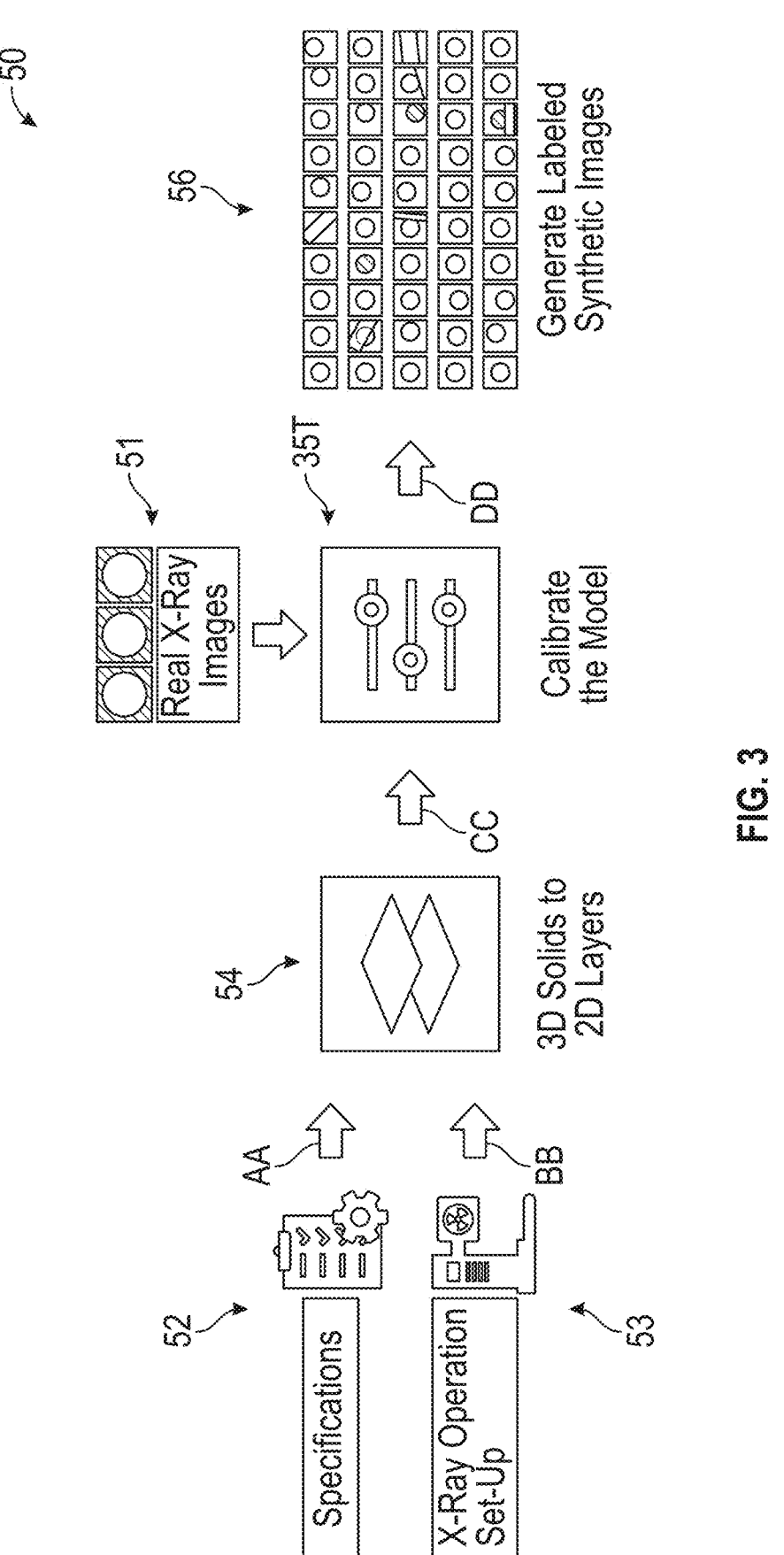
FIG. 3 is a flow diagram illustrating a process for generating labeled synthetic images as part of the automated rivet inspection process shown in FIG. 1.

Referring now to FIG. 3, the ARDD system 30 described generally above with reference to FIG. 1 may rely on synthetic data generation as a training input to a set of characterization training model(s) 35T. Such an approach may be advantageous due to a potential scarcity of real fastener inspection results or data. To this end, the ARDD system 30 may employ the synthetic data generation pipeline 50 of FIG. 3 to enhance the overall accuracy of related model training.

Synthetic data generation: creating synthetic images resembling real radiographic scans may be challenging due to the need for precise measurements of structural details, such as but not limited to hole size and fastener specifications. This problem is exacerbated when inspecting oversized components or non-planar surfaces, requiring precise shooting angles and positions for each inspected fastener 14. To address this, the synthetic data generation pipeline 50 of FIG. 3 may employ a computer vision solution to generate synthetic data as labeled pre-trained classifiers 56 of representative installed fasters 14 of a predetermined quality, i.e., as synthetic images. Inputs to the synthetic data generation pipeline 50 may include, e.g., rivet specifications 52, e.g., definitions of representative shapes, sizes, background noise, etc., for a training set of rivets 140.

The synthetic data generation pipeline 50 is also informed by set up information 53 ("X-Ray Operation Set-Up"), including the particular position(s) of the radiographic generator 26 of FIG. 1 relative to the inspected hypothetical workpiece. As indicated by arrows AA and BB, the rivet specifications 52 and the setup information 53 are respectively processed to convert three-dimensional (3D) solid images to two-dimensional (2D) layers ("3D Solids to 2D Layers"). As indicated by arrow CC, the 2D layers of the various test rivets 140 are then used to calibrate one or more ML models 35 for use by the ARDD system 30 of FIG. 1, possibly by validating the 2D layers 54 against real radiographic images 51, shown as representative "Real X-Ray Images"), i.e., from actual installed rivets 140. The output indicated by arrow DD is thus a large training dataset of various baseline defected and non-defected rivets 140 and 140D, which can be used as the pre-trained classifiers 56 of the ARDD system 30.

Figure 4:
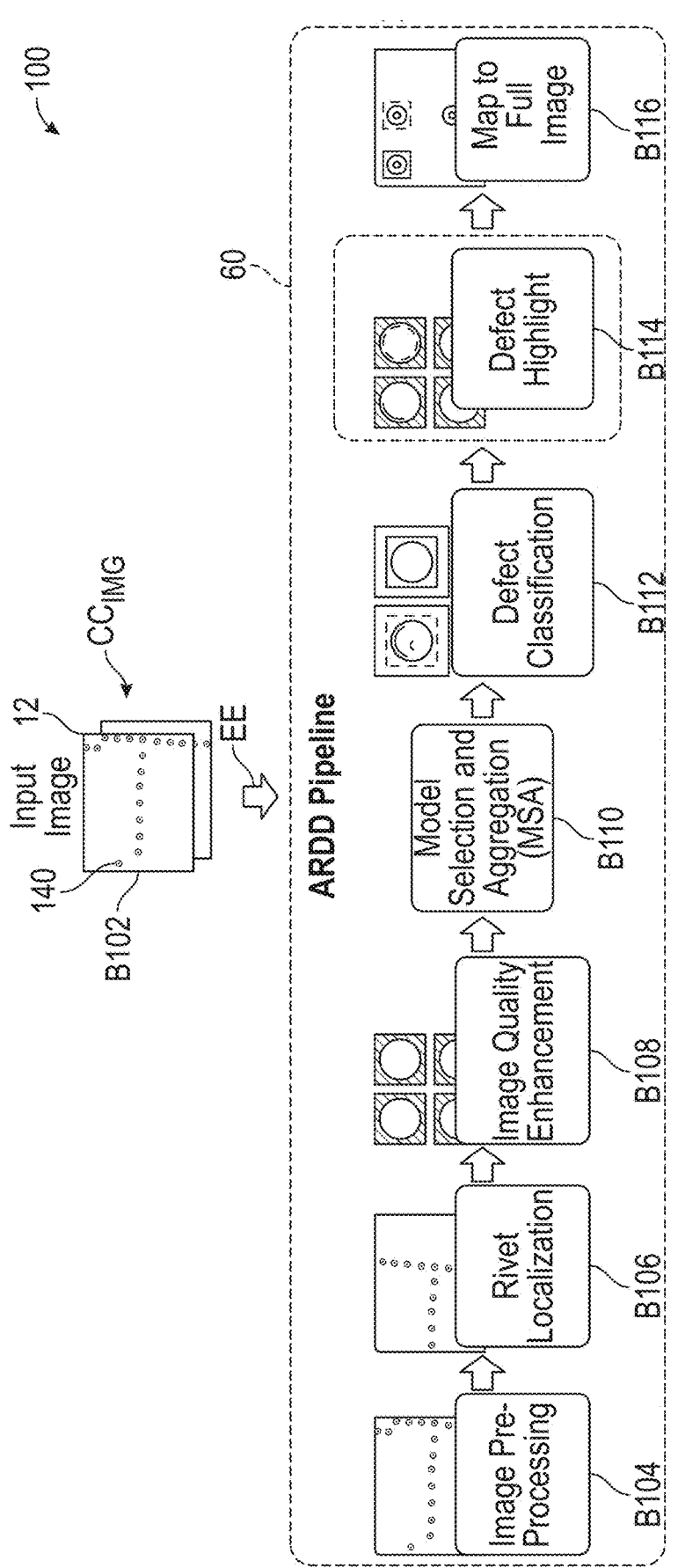
FIG. 4 is a flow diagram depicting an automated rivet defect detection (ARDD) method usable as part of the inspection process of FIG. 1.

Referring to FIG. 4, the present method 100 uses a hybrid approach for defect detection, with computer vision and image processing-based approaches used for image enhancement and localization of the various fasteners 14, or rivets 140 in a non-limiting use case. Individual localized rivets 140 are fed into the trained ML model(s) 36 of the computer device 30 (FIG. 1) for real-time non-destructive inspection of a population of installed rivets 140.

An embodiment of the method 100 is described via a series of algorithm steps or logic blocks for illustrative clarity. Each of the logic blocks of the method 100 may be programmed as machine-readable instructions in memory 32 of the ARDD system 30 shown in FIG. 1 and executed by the processor 34, e.g., when performing a rivet inspection process of the representative aircraft 16 illustrated in FIG. 1.

Beginning with block B102 ("Input Image"), the ARDD system 30 of FIG. 1 receives the stream of radiographic images ($CC_{IMG}$), for instance as one or more x-ray images of the sheet metal panel 12 and a population of installed rivets 140. The images are then fed into the ARDD Pipeline 60. The method 100 then continues with block B104.

At block B104 ("Image Pre-Processing"), the captured radiographic images of the image stream ($CC_{IMG}$) undergo image preprocessing steps to ready the images for further actions of the ARDD system 30 of FIG. 1. As appreciated in the art, pre-processing may involve the performance of various image processing techniques, including but not limited to gray-scale normalization and/or intensity adjustment. The method 100 thereafter proceeds to block B106.

Block B106 ("Rivet Localization") entails identifying the rivets 140 in the images of the image stream ($CC_{IMG}$), for instance using machine vision system functions such as and thereafter localizing the rivets 140 in the images. Localizing in the present context entails determining the 2D (or possibly 3D) position of each of the rivets 140 within pixel images of the image stream ($CC_{IMG}$).

Referring briefly to FIG. 5, a result of rivet localization in block B106 may include a digital image 61, for instance of the sheet metal panel 12 in this representative case. Each rivet 140 once identified and localized in the x-ray image(s) ($CC_{IMG}$) may be surrounded by a bounding box 62. The area of circular contour corresponds to the localized rivet head 15 (see FIG. 2), while the bounding boxes 62 surrounds regions of interest for further processing. As most of the surface area of the sheet metal panel 12 is eliminated from consideration at block B106, the ARDD system 30 is able to conserve computational resources for inspection of only the relevant areas within the bounding boxes 62. The method 100 then proceeds to block B108.

At block B108 ("Image Quality Enhancement"), the ARDD system 30 may enhance the resulting images for further analysis. This may be limited to detected and localized defected rivets 140D to further reduce computational load. Image processing steps performed in block B108 may include, e.g., contrast and/or brightness enhancement. The method 100 then proceeds to block B110.

Block B110 ("Model Selection and Aggregation (MSA))" may include selecting a pre-trained characterization model 36 (FIG. 1) for use in classification of the rivets 140 of the enhanced set from block B108 from a set of computer vision-based, machine learning-based, and hybrid models. Block B110 may include identifying and listing a model considered to be the most suitable for the particular inference task at hand, e.g., by selecting a predetermined model that was previously vetted offline for the particular fastener being inspected. The method 100 proceeds to block B114 once the trained model or models are selected.

Block B112 ("Defect Classification") entails classifying the rivets 140 in the enhanced set of x-ray image(s) from block B108 using the selected model or models from block B110. When using multiple characterization models 36, each model 36 may classify the input data to produce its own unique output. As part of block B112, the ARDD system 30 may also aggregate the individual predictions into a coherent result, i.e., as a final classification decision.

Referring briefly to FIGS. 6A and 6B, a classification result of block B112 is shown for defected and non-defected rivets 140D and 140ND, respectively. Here, the bounding box 62 from FIG. 5 may be color-coded to represent a particular classification status of the examined rivet 140. For example, the defected rivet 140D of FIG. 6A may be surrounded by a bounding box 62R having a color, e.g., red, which is indicative of the presence of a defect 48. In contrast, a non-defected rivet 140ND as shown in FIG. 6B may be surrounded by a bounding box 62G having another representative color, e.g., green, which is indicative of a lack of a detected defect. The method 100 proceeds to block B114 once the defects have been classified.

Figures 7A, 7B:
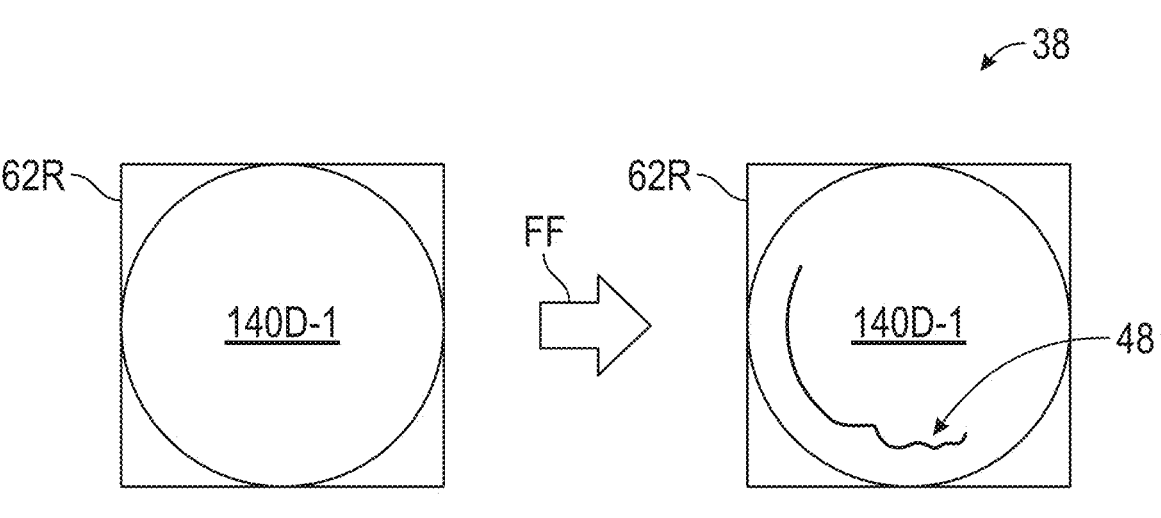
FIGS. 7A and 7B are illustrations of defected rivets and corresponding graphical overlays describing locations of defects thereon.

Referring once again to FIG. 4, and continuing with block B110 ("Defect Highlighting"), the ARDD system 30 of FIG. 1 may highlight defected pixel locations in the classified rivet images provided from block B112. The ARDD system 30 may do so by detecting edges of the defect(s) and thereafter identifying the defected region. FIG. 7A illustrates a defected rivet 140D-1 processed at block B114, as indicated by arrow FF, to produce a highlighted defect 48. This process may continue for each of the defected rivets 140D-1 in the population of rivets 140 under inspection, i.e., 140D-1, . . . , 140D-n, with the "n$^{th}$" rivet 140 shown in FIG. 7B as being processed in block B114 (arrow GG) and having a highlighted defect 148. The method 100 then proceeds to block B116.

At block B116 ("Map to Full Image"), the ARDD system 30 may optionally map the images from block B112 and B114, i.e., classified and highlighted images, to a larger composite image 40 (FIG. 1) as needed. As appreciated in the art, larger images such as of the full bulkhead panel 120 of FIG. 1 may require mosaicking, stitching, or other approaches when constructing the composite image 40 from a set of smaller, more localized images. This process may occur at block B116 in one or more embodiments to construct a large composite image for use as part of the NDI process, or for creating a historical record for context.

The proposed solution to NDI of rivets 140 and other fasteners 14 is thus a hybrid use of computer vision and machine learning techniques that produces accurate defect detection results with minimal processing time. As an example, NDI of a population of about 200-500 rivets may require approximately 60 seconds of processing time or less using the ARDD system 30 and method 100 described herein. The present teachings are therefore usable as an efficient tool for performing rivet inspection and aiding a human inspector in the identification of defected rivets 140D for potential repair, replacement, or root cause analysis. These and other attendant benefits will be readily appreciated by those skilled in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The illustrations of the configurations described herein are intended to provide a general understanding of the structure of the various configurations. The illustrations are not intended to serve as a complete description of all of the elements and features of apparatus and systems that utilize the structures or methods described herein. Many other configurations may be apparent to those of skill in the art upon reviewing the disclosure. Other configurations may be utilized and derived from the disclosure, such that structural and logical substitutions and changes may be made without departing from the scope of the disclosure. Accordingly, the disclosure and the figures are to be regarded as illustrative rather than restrictive.

The following Clauses provide some example configurations of the present solutions as disclosed herein.

Clause 1: A system for automated inspection of an installed fastener, comprising: a radiographic generator operable for directing scanning beams of electromagnetic radiation toward a workpiece having the installed fastener; a radiographic image sensor configured to collect a radiographic image of the workpiece including the installed fastener; and a computer device in communication with the radiographic image sensor, wherein the computer device is configured to process the radiographic image via one or more trained characterization models to thereby localize the installed fastener within the radiographic image, identify a presence or absence of a defect in the installed fastener, characterize a quality of the installed fastener based on the presence or absence of the defect, and generate an inspection report indicative of the quality of the fastener, the inspection report including an annotated image of the installed fastener.

Clause 2: The system of clause 1, wherein the installed fastener is part of a population of installed fasteners on a workpiece, and wherein the computer device is configured to generate a composite image of the workpiece, the composite image visually identifying the installed fasteners that are defected fasteners.

Clause 3: The system of clauses 1 or 2, wherein computer device is configured to output a bounding box around at least the defected fasteners, the bounding box forming a color-coded graphic of the defected fasteners as part of the annotated image.

Clause 4: The system of clause 3, wherein the bounding box is a red bounding box that individually surrounds each respective one of the defected fasteners.

Clause 5: The system of clause 4, wherein a representation of a defect is displayed within the red bounding box.

Clause 6: The system of any of clauses 1-5, wherein the trained model forms a population of representative defected fasteners and a population of representative non-defected fasteners.

Clause 7: The system of any of clauses 1-6, wherein the radiographic generator includes an x-ray generator.

Clause 8: The system of any of clauses 1-7, wherein the installed fastener is a solid shank rivet, and wherein the system is configured to inspect the solid shank rivet via the x-ray generator.

Clause 9: A method for inspecting an installed fastener in a workpiece, comprising: generating scanning beams of electromagnetic radiation via radiographic generator; directing the scanning beams of electromagnetic radiation toward the workpiece having the installed fastener; collecting a radiographic image of the workpiece including the installed fastener via a radiographic image sensor; and processing the radiographic image via one or more trained models of a computer device, including: localizing the installed fastener within the radiographic image; identifying a presence or absence of a defect in the installed fastener; characterizing a quality of the installed fastener based on the presence or absence of the defect; and generating an inspection report via the computer device that is indicative of the quality of the fastener, the inspection report including an annotated image of the installed fastener.

Clause 10: The method of clause 9, wherein the installed fastener is part of a population of installed fasteners on a workpiece, further comprising: generating a composite image of the workpiece via the computer device, the composite image visually identifying the installed fasteners that are defected fasteners.

Clause 11: The method of clause 9 or 10, further comprising: outputting a bounding box around at least the defected fasteners, via the computer device, the bounding box forming a color-coded graphic of the defected fasteners as part of the annotated image.

Clause 12: The method of clause 11, wherein outputting the bounding box around at least the defected fasteners includes outputting a red bounding box that individually surrounds each respective one of the defected fasteners.

Clause 13: The method of clause 13, wherein outputting the bounding box around at least the defected fasteners includes displaying a representation of a defect within the red bounding box.

Clause 14: The method of any of clauses 9-13, wherein processing the radiographic image via the one or more trained models of the computer device includes forming a population of representative defected fasteners and a population of representative non-defected fasteners.

Clause 15: The method of any of clauses 9-14, wherein generating scanning beams of electromagnetic radiation via radiographic generator includes generating x-ray scanning beams via an x-ray generator.

Clause 16: The method of any of clauses 9-15, wherein the installed fastener is a solid shank rivet, and wherein characterizing the quality of the installed fastener based on the presence or absence of the defect includes characterizing a crack, porosity, or cavitation in the solid shank rivet.

Clause 17: The method of any of clauses 1-16, whether the workpiece is a sheet metal panel, the method further comprising: installing the solid shank rivet into the sheet metal panel.

Clause 18: A computer device for automated inspection of a population of installed rivets, comprising: a processor; and a non-transitory computer-readable storage memory on which is written instructions, wherein the instructions are executable by the processor to cause the computer device to: receive x-ray images of the installed rivets from an x-ray sensor; process the x-ray images via one or more trained characterization models to thereby localize the installed rivet within the x-ray images; identify a presence or absence of a defect in each of the installed rivets via the computer device; characterize a quality of each of the installed rivets, via the computer device, based on the presence or absence of the defect; and generate an inspection report indicative of the quality of each of the installed rivets, the inspection report including a respective color-coded bounding boxes around each of the installed rivets, the color-coded bounding box forming a color-coded graphic of defected rivets and non-defected rivets.

Clause 19: The computer device of clause 18, wherein the instructions are executable by the processor to cause the computer device to display a representation of a defect within the bounding box of the defected rivets.

Clause 20: The computer device of clause 19, wherein the instructions are executable by the processor to cause the computer device to display the representation of the defect as a crack, porosity, or cavitation in the defected rivets.

What is claimed is:

1. A system for automated inspection of an installed fastener, the system comprising:
a radiographic generator operable for directing beams of electromagnetic radiation toward a workpiece having the installed fastener;
a radiographic image sensor configured to collect a radiographic image of the workpiece and the installed fastener; and
a computer device in communication with the radiographic image sensor, wherein the computer device is configured to process the radiographic image via one or more trained characterization models trained on radiographic images of defected and non-defected fasteners to thereby localize the installed fastener within the radiographic image, identify a presence or absence of an internal defect in the installed fastener, characterize a quality of the installed fastener based on the presence or absence of the internal material defect, and generate an inspection report indicative of the quality of the fastener, the inspection report including an annotated radiographic image identifying a location of the internal material defect within the installed fastener.

2. The system of claim 1, wherein the installed fastener is part of a population of installed fasteners on the workpiece, and wherein the computer device is configured to generate a composite image of the workpiece, the composite image visually identifying the installed fasteners that are defected fasteners.

3. The system of claim 2, wherein computer device is configured to output a bounding box around at least the defected fasteners, the bounding box forming a color-coded graphic of the defected fasteners as part of the annotated image.

4. The system of claim 1, wherein the one or more trained characterization models form a population of representative defected fasteners and a population of representative non-defected fasteners.

5. The system of claim 1, wherein the radiographic generator includes an x-ray generator.

6. The system of claim 5, wherein the installed fastener is a solid shank rivet, and wherein the system is configured to inspect the solid shank rivet via the x-ray generator.

7. The system of claim 1, wherein the internal material defect comprises at least one of a microscopic crack, cavitation, and porosity.

8. A method for inspecting an installed fastener in a workpiece, the method comprising:
generating scanning beams of electromagnetic radiation via a radiographic generator;
directing the scanning beams of electromagnetic radiation toward the workpiece having the installed fastener;
collecting a radiographic image of the workpiece including the installed fastener via a radiographic image sensor; and
processing the radiographic image via one or more trained characterization models trained on radiographic images of defected and non-defected fasteners, including:
localizing the installed fastener within the radiographic image;
identifying a presence or absence of an internal material defect in the installed fastener;
characterizing a quality of the installed fastener based on the presence or absence of the internal material defect; and
generating an inspection report, via a computer device, that is indicative of the quality of the fastener, the inspection report including an annotated radiographic image identifying a location of the internal material defect within the installed fastener.

9. The method of claim 8, wherein the installed fastener is part of a population of installed fasteners on a workpiece, further comprising:
generating a composite image of the workpiece via the computer device, the composite image visually identifying the installed fasteners that are defected fasteners.

10. The method of claim 9, further comprising:
outputting a bounding box around at least the defected fasteners, via the computer device, the bounding box forming a color-coded graphic of the defected fasteners as part of the annotated image.

11. The method of claim 10, wherein processing the radiographic image via the one or more trained characterization models includes using the one or more trained characterization models as a population of representative defected fasteners and a population of representative non-defected fasteners.

12. The method of claim 10, wherein generating scanning beams of electromagnetic radiation via the radiographic generator includes generating x-ray scanning beams via an x-ray generator.

13. The method of claim 10, wherein the installed fastener is a solid shank rivet, and wherein characterizing the quality of the installed fastener based on the presence or absence of the defect includes characterizing a crack, porosity, or cavitation in the solid shank rivet.

14. The method of claim 13, wherein the workpiece includes a sheet metal panel, the method further comprising: installing the solid shank rivet into the sheet metal panel.

15. The method of claim 8, wherein outputting the bounding box around at least the defected fasteners includes displaying a representation of a defect within the red bounding box.

16. The method of claim 8, wherein the internal material defect comprises at least one of a microscopic crack, cavitation, and porosity.

17. A computer device for automated inspection of a population of installed rivets, comprising:

a processor; and a non-transitory computer-readable storage medium on which is written instructions, wherein the instructions are executable by the processor to cause the computer device to:

receive x-ray images of the installed rivets from an x-ray sensor;

process the x-ray images via one or more trained characterization models trained on radiographic images of defected and non-defected fasteners to thereby localize the installed rivets within the x-ray images;

identify a presence or absence of an internal material defect in each of the installed rivets;

characterize a quality of each of the installed rivets based on the presence or absence of the internal material defect; and generate an inspection report indicative of the quality of each of the installed rivets, the inspection report including a respective color-coded bounding boxes around each of the installed rivets, the color-coded bounding box forming a color-coded graphic of defected rivets and non-defected rivets.

18. The computer device of claim 17, wherein the instructions are executable by the processor to cause the computer device to display a representation of a defect within the bounding box of the defected rivets.

19. The computer device of claim 18, wherein the instructions are executable by the processor to cause the computer device to display the representation of the defect as a crack, porosity, or cavitation in the defected rivets.

20. The computer device of claim 17, wherein the internal material defect comprises at least one of a microscopic crack, cavitation, and porosity.

\* \* \* \* \*